(12) United States Patent
Lane

(10) Patent No.: US 8,044,734 B2
(45) Date of Patent: Oct. 25, 2011

(54) METHOD AND APPARATUS FOR MITIGATING VCO PULLING

(75) Inventor: Mark Vernon Lane, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 186 days.

(21) Appl. No.: 12/184,728

(22) Filed: Aug. 1, 2008

(65) Prior Publication Data

US 2010/0026395 A1 Feb. 4, 2010

(51) Int. Cl.
*H03B 5/20* (2006.01)
(52) U.S. Cl. .......... 331/135; 331/16; 331/137; 331/182; 455/75; 455/85; 455/86
(58) Field of Classification Search .................. 331/135, 331/137, 182, 16; 455/75, 85, 86
See application file for complete search history.

(56) References Cited

U.S. PATENT DOCUMENTS

| | | | | |
|---|---|---|---|---|
| 5,276,915 A * | 1/1994 | Marko et al. | ..................... | 455/86 |
| 5,424,692 A | 6/1995 | McDonald | | |
| 5,946,268 A * | 8/1999 | Iwamoto et al. | ............ | 365/233.1 |
| 6,850,749 B2 * | 2/2005 | Soorapanth et al. | .......... | 455/318 |
| 7,409,192 B2 | 8/2008 | Lombardi et al. | | |
| 7,480,343 B2 | 1/2009 | Eikenbroek et al. | | |
| 2005/0186930 A1 * | 8/2005 | Rofougaran et al. | ......... | 455/260 |
| 2006/0009171 A1 * | 1/2006 | Xu et al. | ..................... | 455/114.2 |
| 2006/0202767 A1 * | 9/2006 | Nayler | .............................. | 331/16 |
| 2007/0015481 A1 | 1/2007 | Hirose et al. | | |
| 2008/0002788 A1 * | 1/2008 | Akhtar et al. | .................. | 375/298 |
| 2008/0113625 A1 * | 5/2008 | Maeda et al. | ............... | 455/67.14 |
| 2008/0139150 A1 * | 6/2008 | Li et al. | .......................... | 455/230 |

OTHER PUBLICATIONS

Razavi, "A Study of Injection Locking and Pulling in Oscillators", IEEE Journal of Solid-State Circuits, Sep. 9, 2004, pp. 1415-1424, vol. 39, No. 9.
International Search Report and the Written Opinion—PCT/US2009/052574, International Search Authority—European Patent Office—Oct. 6, 2009.

* cited by examiner

*Primary Examiner* — Arnold Kinkead
*Assistant Examiner* — Richard Tan
(74) *Attorney, Agent, or Firm* — Kenneth K. Vu

(57) ABSTRACT

Techniques for mitigating VCO pulling are described. In an aspect, VCO pulling may be mitigated by (i) injecting an oscillator signal, which is a version of a VCO signal from a VCO, into a transmitter and (ii) using coupling paths from the transmitter to the VCO to re-circulate the oscillator signal back to the VCO. In one design, an apparatus includes a VCO and a coupling circuit. The VCO generates a VCO signal at N times a desired output frequency. The coupling circuit receives an oscillator signal generated based on the VCO signal and injects the oscillator signal into a transmitter to mitigate pulling of the frequency of the VCO due to undesired coupling from the transmitter to the VCO. The apparatus may include a phase adjustment circuit that adjusts the phase of the oscillator signal and/or an amplitude adjustment circuit that adjusts the amplitude of the oscillator signal.

29 Claims, 8 Drawing Sheets

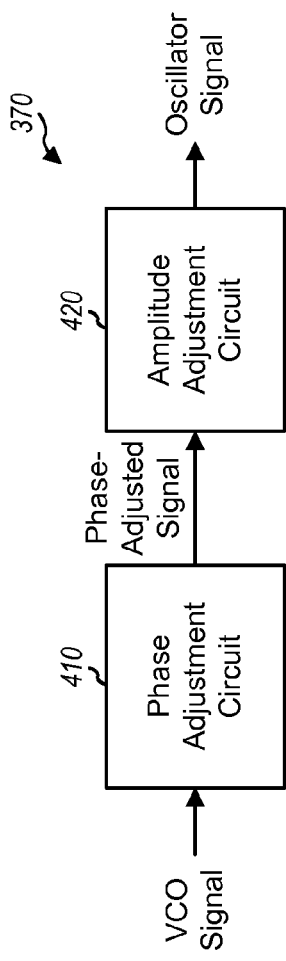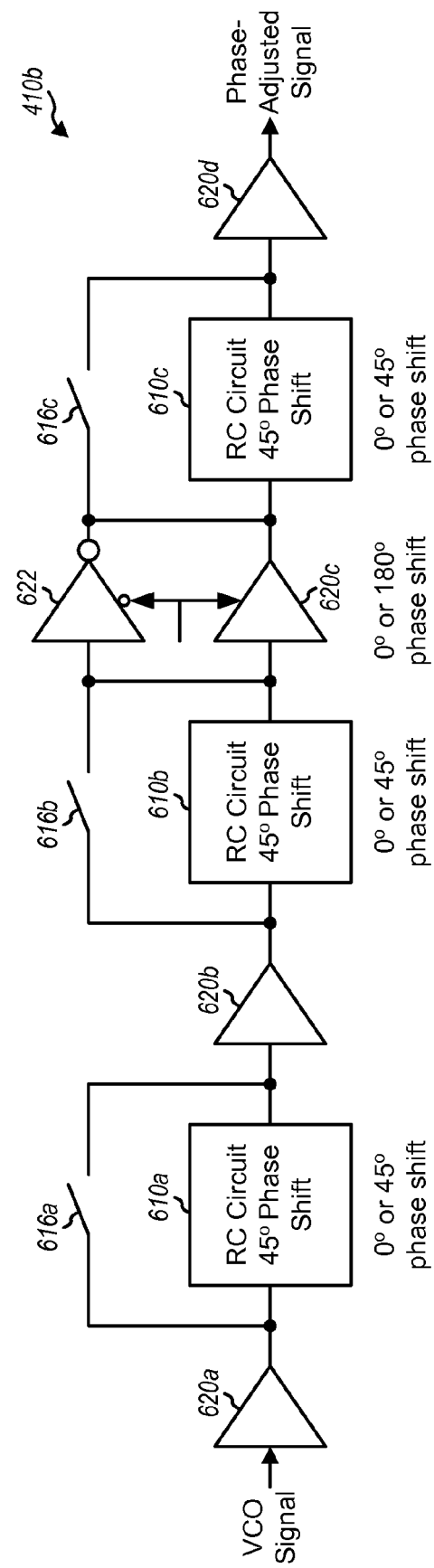
FIG. 4
FIG. 6

METHOD AND APPARATUS FOR MITIGATING VCO PULLING

BACKGROUND

I. Field

The present disclosure relates generally to electronics, and more specifically to techniques for mitigating pulling of frequency of a voltage-controlled oscillator (VCO).

II. Background

In a wireless communication system, a transmitter may upconvert a baseband signal with a local oscillator (LO) signal and generate a radio frequency (RF) output signal that is suitable for transmission via a wireless channel. The transmitter may generate the LO signal with a VCO operating at N times the desired frequency of the RF output signal, where N may be one or greater. The RF output signal may have a large amplitude. A portion of the RF output signal may couple from the transmitter to the VCO and may pull the VCO off the desired frequency. This phenomenon is commonly referred to as VCO pulling or frequency pulling. VCO pulling may degrade the performance of the transmitter.

SUMMARY

Techniques for mitigating VCO pulling are described herein. In an aspect, VCO pulling may be mitigated by (i) injecting an oscillator signal, which is a version of a VCO signal from a VCO, into a transmitter and (ii) using coupling paths from the transmitter to the VCO to re-circulate the oscillator signal back to the VCO. The re-circulated oscillator signal may reduce or stop VCO pulling.

In one design, an apparatus includes a VCO and a coupling circuit. The VCO generates a VCO signal at N times a desired output frequency. The coupling circuit receives an oscillator signal generated based on the VCO signal and injects the oscillator signal into a transmitter to mitigate pulling of the frequency of the VCO due to undesired coupling from the transmitter to the VCO. The apparatus may further include (i) a phase adjustment circuit that adjusts the phase of the oscillator signal and/or (ii) an amplitude adjustment circuit that adjusts the amplitude of the oscillator signal. The phase adjustment circuit may adjust the phase of the oscillator signal in discrete steps and may provide one of a plurality of discrete phase shifts for the oscillator signal. The amplitude adjustment circuit may provide amplification with an adjustable gain to adjust the amplitude of the oscillator signal.

The VCO may receive a transmit component and a VCO component via the undesired coupling from the transmitter to the VCO. The transmit component may comprise the N-th harmonic of a modulated signal in the transmitter and may cause VCO pulling. The VCO component may comprise a component of the injected oscillator signal at the VCO frequency and may mitigate VCO pulling. The amplitude of the oscillator signal may be set such that the VCO component is larger than the transmit component at the VCO.

Various aspects and features of the disclosure are described in further detail below.

BRIEF DESCRIPTION OF THE DRAWINGS

FIG. 4 shows a block diagram of an amplitude and phase adjustment circuit.

FIG. 6 shows a schematic diagram of another phase adjustment circuit.

DETAILED DESCRIPTION

The techniques described herein may be used for various communication devices and systems. For example, the techniques may be used for wireless communication devices, cellular phones, personal digital assistants (PDAs), handheld devices, wireless modems, laptop computers, cordless phones, Bluetooth devices, etc. For clarity, the use of the techniques for a wireless communication device, which may be a cellular phone or some other device, is described below.

Figure 1:
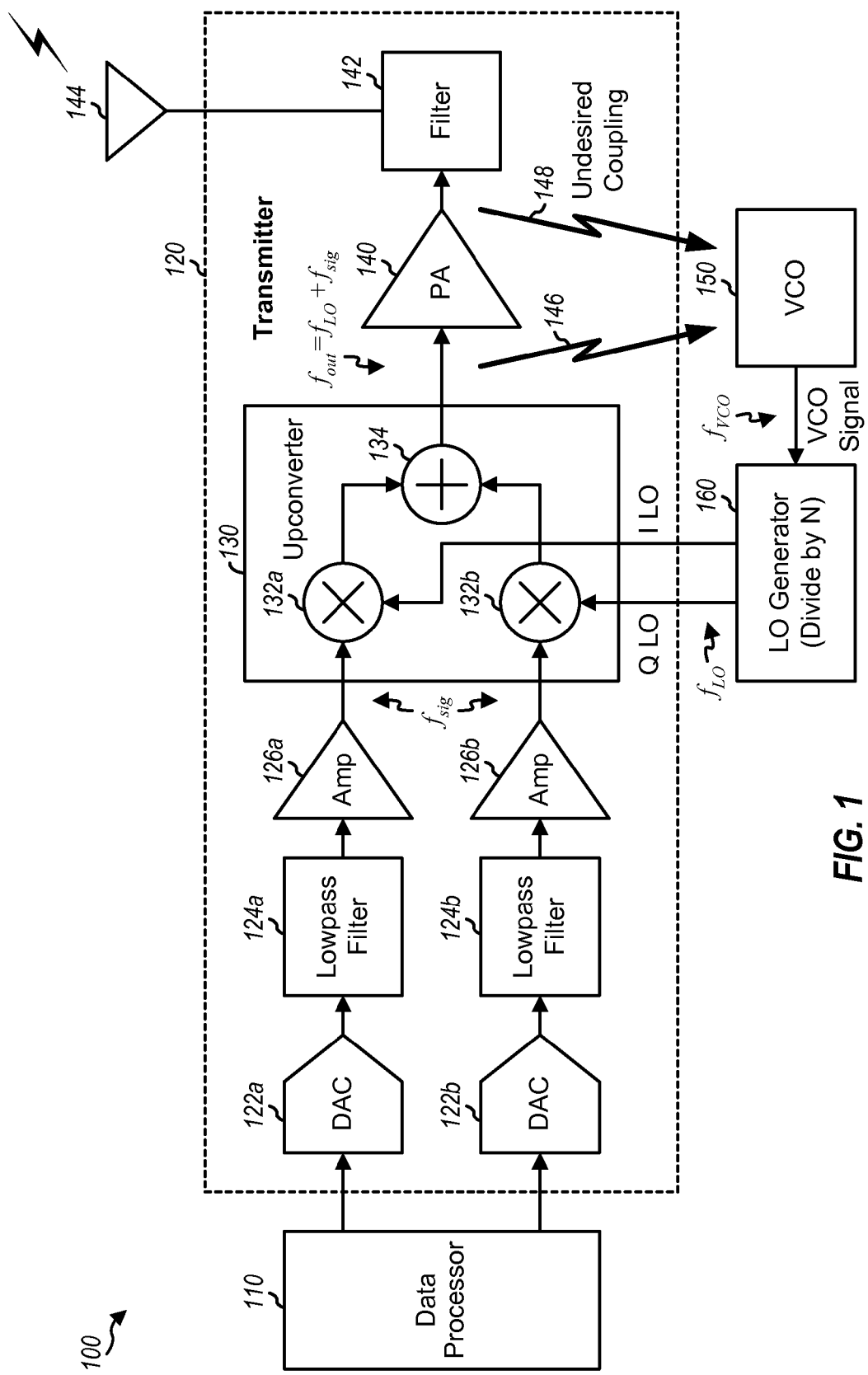
FIG. 1 shows a block diagram of a wireless communication device.

FIG. 1 shows a block diagram of a wireless communication device 100. Within wireless device 100, a data processor 110 processes data to be transmitted and provides an inphase (I) data stream and a quadrature (Q) data stream to a transmitter 120. Within transmitter 120, a digital-to-analog converter (DAC) 122a receives and converts the I data stream from digital to analog and provides an I analog signal. A DAC 122b receives and converts the Q data stream from digital to analog and provides a Q analog signal. Lowpass filters 124a and 124b filter the I and Q analog signals, respectively, to remove images caused by the digital-to-analog conversion. Amplifiers (Amp) 126a and 126b amplify the signals from lowpass filters 124a and 124b, respectively, and provide I and Q baseband signals.

An upconverter 130 receives the I and Q baseband signals from amplifiers 126a and 126b and I and Q LO signals from an LO generator 160 and generates an upconverted signal. Within upconverter 130, a mixer 132a modulates the I LO signal with the I baseband signal. A mixer 132b modulates the Q LO signal with the Q baseband signal. A summer 134 sums the outputs of mixers 132a and 132b and provides the upconverted signal. The I and Q baseband signals have a frequency of $f_{sig}$, which is typically low and may be from 0 to few megahertz (MHz) for many systems. The I and Q LO signals have a frequency of $f_{LO}$, which is determined by the desired output frequency. The upconverted signal has a frequency of $f_{out} = f_{LO} + f_{sig}$.

A power amplifier (PA) 140 amplifies the upconverted signal to obtain the desired output power level. A filter 142 filters the signal from power amplifier 140 to remove images caused by the frequency upconversion and provides an RF output signal. Filter 142 may be a lowpass filter, a duplexer, etc. The RF output signal is transmitted via an antenna 144.

A VCO 150 generates a VCO signal having a frequency of $f_{VCO}$, which is N times the desired output frequency. The desired output frequency is dependent on the frequency band and frequency channel used by the system. In general, N may be one or greater. However, N is commonly equal to two or four. An LO generator 160 receives the VCO signal, divides the VCO signal in frequency by a factor of N, and generates the I and Q LO signals for upconverter 130. The LO signals are at the desired output frequency, which is $f_{LO} = f_{VCO}/N$.

FIG. 1 shows an example design of a transmitter. In general, the conditioning of the signals in the transmitter may be performed by one or more stages of amplifier, filter, mixer, etc. The circuits in the transmitter may be arranged differently from the configuration shown in FIG. 1. Furthermore, other circuits not shown in FIG. 1 may also be used to condition the signals in the transmitter. The transmitter may be implemented on one or more RF integrated circuits (RFICs), mixed-signal ICs, etc.

VCO 150 is typically sensitive to energy that is re-circulated into the VCO circuit. The re-circulation may occur in various ways but is primarily radiated or conducted from one or more RF circuits within transmitter 120 back into VCO 150. For example, a portion of the signal from upconverter 130 may couple to VCO 150 via a coupling path 146 and/or a portion of the signal from power amplifier 140 may couple to VCO 150 via a coupling path 148. In general, there may be any number of coupling paths from the RF circuits in the transmitter to the VCO, and each coupling path may provide any amount of coupling. In any case, the re-circulated energy via the undesired coupling paths may cause a phenomenon known as VCO pulling, which is pulling of the frequency of the VCO off the desired output frequency.

VCO 150 is particularly sensitive to energy that is close to the operating frequency of the VCO. VCO 150 has a response of 1/s and becomes more sensitive to re-circulated energy as the frequency of the re-circulated energy approaches the VCO frequency. In fact, the sensitivity of VCO 150 follows a traditional frequency modulation (FM) de-emphasis curve of 6 decibel (dB) per octave. This means that the sensitivity of VCO 150 to re-circulated energy rolls off at 6 dB per octave from the VCO frequency.

Transmitter 120 implements a direct upconversion architecture and performs frequency upconversion from baseband directly to RF. Upconverter 130 is driven with the I and Q LO signals and the I and Q baseband signals. The baseband signals are typically limited in frequency to few MHz or less. Thus, the difference between the output frequency $f_{out}$ and the LO frequency $f_{LO}$ is typically small. The I and Q LO signals may be generated based on the VCO signal from the VCO, e.g., by dividing the VCO signal in frequency by a factor of N. The difference between the N-th harmonic of the output frequency and the VCO frequency is then N times the baseband frequency, or $N \cdot f_{out} - f_{VCO} = N \cdot f_{sig}$, which may be relatively small. In this case, unless a high degree of isolation is achieved from the RF stages in the transmitter to the VCO, the re-circulated energy from these RF stages will pull the frequency of the VCO off the desired output frequency. This VCO pulling may cause severe distortion of the RF output signal.

Figure 2A:
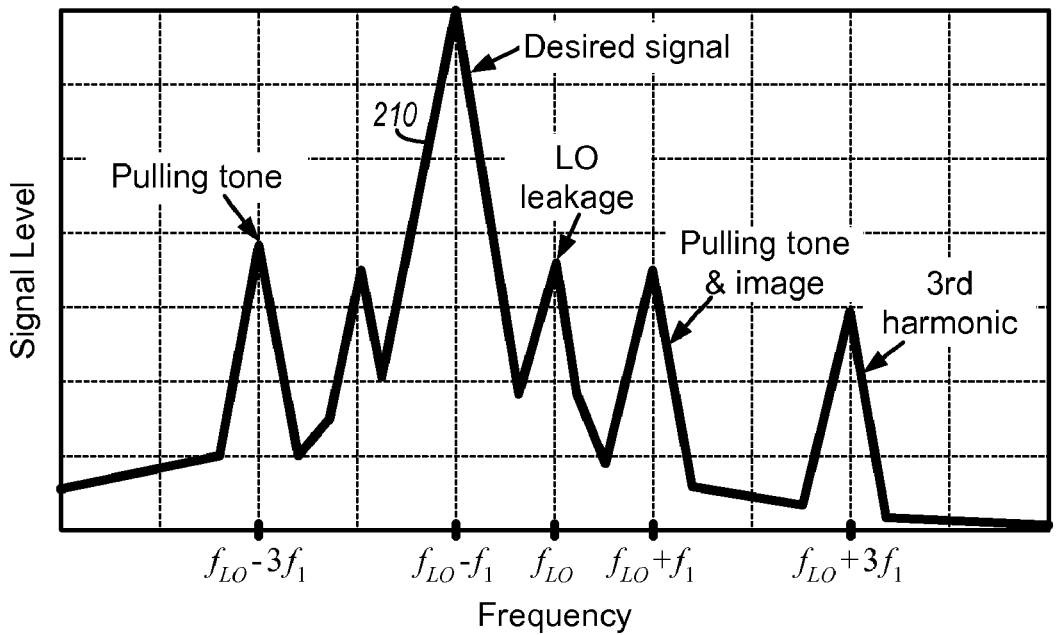
FIG. 2A shows distortions in an RF output signal due to VCO pulling.

FIG. 2A shows distortions in the RF output signal due to VCO pulling for a case in which the VCO frequency is twice the LO frequency, or $f_{VCO} = 2f_{LO}$. In FIG. 2A, the horizontal axis represents frequency, and the vertical axis represents signal level. For simplicity, a plot 210 shows the spectral response of the RF output signal with the baseband signals including a single tone at a frequency of $-f_1$. As shown in FIG. 2A, the RF output signal includes the single tone at a frequency of $f_{LO} - f_1$, LO leakage at a frequency of $f_{LO}$, an image of the single tone at a frequency of $f_{LO} + f_1$, and third harmonic of the baseband signal at a frequency of $f_{LO} + 3f_1$. The LO leakage, the image, and the third harmonic are typical upconverter distortion components. The RF output signal further includes pulling tones at frequencies of $f_{LO} - 3f_1$ and $f_{LO} + f_1$. The pulling tones are due to VCO pulling and degrade the RF output signal quality.

When $f_{VCO} = 2f_{LO}$, the second harmonic of the output frequency ($2f_{out}$) is close to the VCO frequency. The difference between the VCO frequency and the second harmonic of the output frequency is twice the baseband frequency, or $2f_{out} - f_{VCO} = 2f_{sig}$. This difference frequency of $2f_{sig}$ modulates the VCO and results in Bessel components at $f_{out} \pm 2f_{sig}$. In general, the location of the Bessel components is dependent on the frequency of the baseband signal, which may be a modulated signal. When the baseband signals contain a single tone at frequency of $-f_1$, the Bessel components are at $f_{LO} - 3f_1$ and $f_{LO} + f_1$, as shown in FIG. 2A. The amplitude of the Bessel components is dependent on the frequency of the baseband signal as well as the amount of coupling from the transmitter to the VCO. In general, the closer the baseband signal frequency is to 0 Hz, the less coupling is required to obtain Bessel components of certain level. Since the VCO is a sensitive circuit, even a small amount of re-circulated energy may cause VCO pulling. VCO pulling is progressively worse for progressively larger Bessel components.

VCO pulling may be mitigated in several ways. In one method, the VCO frequency may be offset from the output frequency by a sufficiently large amount that is not harmonically related to the VCO frequency. This method stops VCO pulling. However, the LO path may become complicated and may occupy more area, consume more power, and have higher cost. In another method, the VCO may be operated at either a sub-harmonic or harmonic of the output frequency, which would then create a large offset between the VCO frequency and the output frequency. However, the frequencies are harmonically or sub-harmonically related, and VCO pulling is only reduced but not stopped. Hence, a significant amount of isolation from the transmitter to the VCO may still be required in order to achieve good performance. The transmitter may be implemented on an RFIC, and the undesired coupling may be via the substrate, inductive coupling, and/or some other mechanism. The amount of isolation achievable on the RFIC may be limited and may not be sufficient to stop VCO pulling.

In an aspect, VCO pulling may be mitigated by injecting an oscillator signal, which is a version of a VCO signal, into a VCO. In general, the oscillator signal may be generated with either the VCO signal or an LO signal and may include component at the VCO frequency. The injection or re-circulation of the oscillator signal may be achieved in various manners. In one design, the oscillator signal may be injected into the transmitter, and the same coupling paths that cause VCO pulling may be used to re-circulate the injected oscillator signal back to the VCO. In another design, the oscillator signal may be coupled directly into the VCO. These designs may reduce or stop VCO pulling even when the VCO is operating at a harmonic or sub-harmonic of the output frequency and even when the isolation between the transmitter and the VCO is limited.

Figure 3:
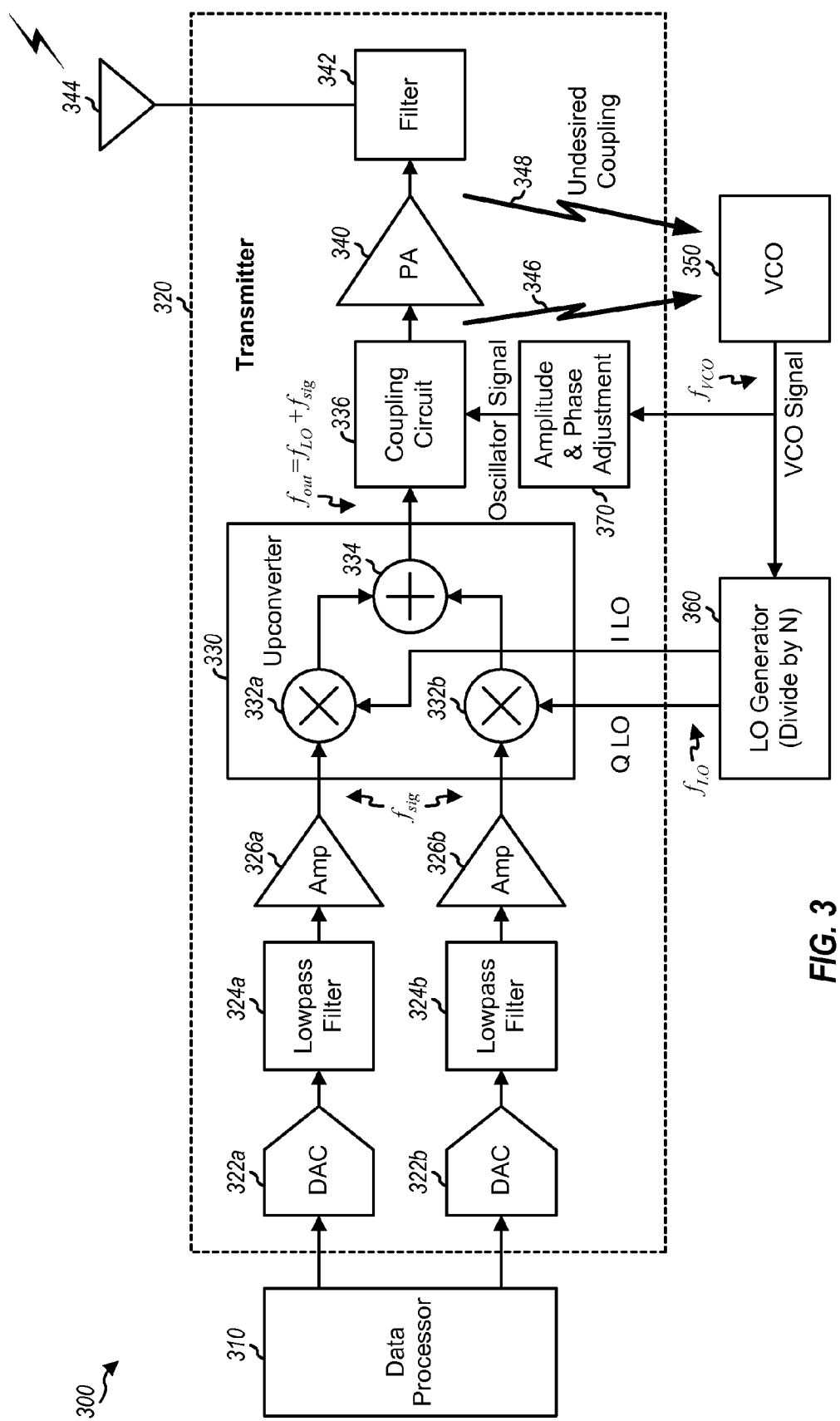
FIG. 3 shows a block diagram of a wireless communication device that can mitigate VCO pulling.

FIG. 3 shows a block diagram of a design of a wireless communication device 300 that can mitigate VCO pulling. Within wireless device 300, a data processor 310 processes data to be transmitted and provides I and Q data streams to a transmitter 320. Within transmitter 320, the I and Q data streams are converted to I and Q analog signals by DACs 322a and 322b, filtered by lowpass filters 324a and 324b, and amplified by amplifiers 326a and 326b to obtain I and Q baseband signals.

An upconverter 330 includes mixers 332a and 342b and a summer 334 that modulate I and Q LO signals with the I and Q baseband signals and provide an upconverted signal. A coupling circuit 336 receives an oscillator signal and injects all or a portion of this oscillator signal into the transmitter. Coupling circuit 336 also passes the upconverted signal. A transmit signal from coupling circuit 336 is amplified by a power amplifier 340, filtered by a filter 342, and transmitted via an antenna 344.

A VCO 350 generates a VCO signal having a frequency of $f_{VCO}$. An LO generator 360 receives the VCO signal, divides the VCO signal in frequency by a factor of N, and generates the I and Q LO signals having a frequency of $f_{LO} = f_{VCO}/N$. An amplitude and phase adjustment circuit 370 receives the VCO signal, varies the amplitude and/or phase of the VCO signal, and provides the oscillator signal having the proper amplitude and phase.

In the design shown in FIG. 3, a feedback loop is used to re-circulate part of the oscillator signal back to VCO 350. This feedback loop is composed of amplitude and phase adjustment circuit 370, coupling circuit 336, and coupling paths 346 and 348 from the transmitter to VCO 350. The oscillator signal, which is a version of the VCO signal, is injected into the transmitter via coupling circuit 336. The injected oscillator signal observes the same gain as the upconverted signal from upconverter 330. However, the injected oscillator signal is filtered and attenuated by filter 342 prior to transmission via antenna 344. A portion of the injected oscillator signal is coupled back to VCO 350 via coupling paths 346 and 348.

In the design shown in FIG. 3, the re-circulated energy at VCO 350 includes two components—a transmit component and a VCO component. The transmit component comprises the N-th harmonic of the modulated signal that causes VCO pulling and is coupled from the transmitter via coupling paths 346 and 348 to VCO 350. The VCO component comprises a component of the oscillator signal at the VCO frequency and is coupled back to VCO 350 via coupling paths 346 and 348. The amount of transmit component at VCO 350 is dependent on coupling paths 346 and 348 and may be reduced by isolating the VCO from the transmitter. The VCO component is used to mitigate VCO pulling. The same coupling paths 346 and 348 that couple the transmit component that causes VCO pulling are also used to couple the VCO component used to mitigate VCO pulling.

In the design shown in FIG. 3, the amplitude and phase of the oscillator signal and thus the VCO component may be varied by adjustment circuit 370. The amplitude adjustment may be used to inject a sufficient amount of oscillator signal into the transmitter. The phase adjustment may be used to avoid cancellation of the closed loop phase in the feedback loop. The amplitude and phase adjustments may be set such that the level of the VCO component is larger than the level of the transmit component at the VCO. The amplitude and phase adjustments may be coarse since the feedback loop is used to re-circulate the oscillator signal and is not used for signal cancellation.

FIG. 4 shows a block diagram of a design of amplitude and phase adjustment circuit 370 in FIG. 3. In this design, circuit 370 includes a phase adjustment circuit 410 followed by an amplitude adjustment circuit 420. Phase adjustment circuit 410 receives the VCO signal, adjusts the phase of the VCO signal, and provides a phase-adjusted signal. Amplitude adjustment circuit 420 receives the phase-adjusted signal, varies the amplitude of this signal, and provides the oscillator signal.

In general, the amplitude and phase adjustments may be performed separately, as shown in FIG. 4, or may be performed jointly. If performed separately, the amplitude adjustment may be performed after the phase adjustment, as shown in FIG. 4, or prior to the phase adjustment. The amplitude adjustment and/or the phase adjustment may also be omitted. For example, the amplitude adjustment may be achieved by varying the amount of coupling of the oscillator signal into the transmitter by coupling circuit 336 in FIG. 3.

Figure 5:
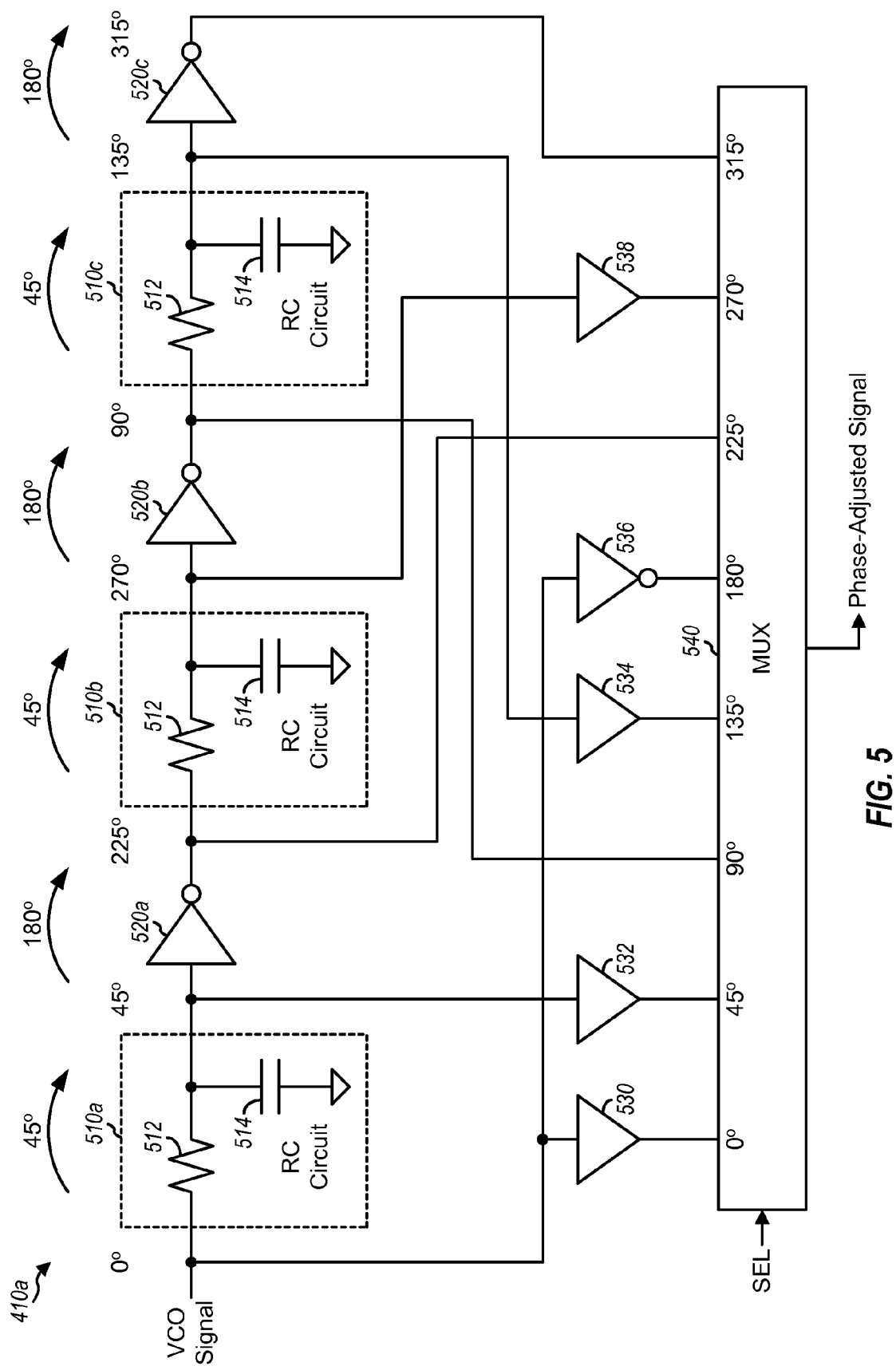
FIG. 5 shows a schematic diagram of a phase adjustment circuit.

FIG. 5 shows a schematic diagram of a phase adjustment circuit 410a, which is one design of phase adjustment circuit 410 in FIG. 4. In this design, phase adjustment circuit 410a can provide phase adjustment from 0° to 315° in increments of 45°.

In the design shown in FIG. 5, phase adjustment circuit 410a includes a main signal path composed of three RC circuits 510a, 510b and 510c coupled in series with three inverters 520a, 520b and 520c. RC circuit 510a has its input receiving the VCO signal and its output coupled to the input of inverter 520a. RC circuit 510b has its input coupled to the output of inverter 520a and its output coupled to the input of inverter 520b. RC circuit 510c has its input coupled to the output of inverter 520b and its output coupled to the input of inverter 520c. Within each RC circuit 510, a resistor 512 is coupled between the input and output of the RC circuit, and a capacitor 514 is coupled between the output and circuit ground.

Each RC circuit 510 may provide 45° of phase shift at the VCO frequency. To obtain 45° phase shift, each RC circuit 510 may have a 3 dB bandwidth that is equal to the VCO frequency. The values of resistor 512 and capacitor 514 for each RC circuit 510 may then be expressed as:

$$f_{VCO} = \frac{1}{2\pi RC}, \qquad \text{Eq (1)}$$

where R is the value of resistor 512 and C is the value of capacitor 514.

The accuracy of the phase shift by each RC circuit 510 is dependent on the accuracy of the resistor and capacitor values. Since coarse phase adjustment is sufficient, the resistor and capacitor values can vary over a relatively wide range.

FIG. 5 shows the phase shifts at different points in the main signal path from the first RC circuit 510a to the last inverter 520c. These phase shifts assume that each RC circuit 510 provides 45° of phase shift and that each inverter 520 provides 180° of phase shift. The phase shift wraps around to 0° whenever it reaches 360°.

Eight signals with eight different phase shifts that are 45° apart may be obtained based on the signals in the main signal path. A buffer 530 receives the VCO signal and provides a first signal having 0° phase shift. A buffer 532 receives the signal from first RC circuit 510a and provides a second signal having 45° phase shift. Inverter 520b provides a third signal having 90° phase shift. A buffer 534 receives the signal from last RC circuit 510c and provides a fourth signal having 135° phase shift. An inverter 536 receives the VCO signal and provides a fifth signal having 180° phase shift. Inverter 520a provides a sixth signal having 225° phase shift. A buffer 538 receives the signal from second RC circuit 510b and provides a seventh signal having 270° phase shift. Inverter 520c provides an eighth signal having 315° phase shift.

A multiplexer (MUX) 540 receives the first through eighth signals at eight inputs. Multiplexer 540 also receives a control signal SEL, selects one of the eight signals based on the control signal, and provides the selected signal as the phase-adjusted signal.

FIG. 6 shows a schematic diagram of a phase adjustment circuit 410b, which is another design of phase adjustment circuit 410 in FIG. 4. Phase adjustment circuit 410b includes a main signal path composed of three RC circuits 610a, 610b and 610c coupled in series with four buffers 620a, 620b, 620c and 620d. Buffer 620a receives the VCO signal at its input. RC circuit 610a has its input coupled to the output of buffer 620a and its output coupled to the input of buffer 620b. RC circuit 610b has its input coupled to the output of buffer 620b and its output coupled to the input of buffer 620c. RC circuit 610c has its input coupled to the output of buffer 620c and its output coupled to the input of buffer 620d. Buffer 620d provides the phase-adjusted signal. An inverter 622 is coupled in parallel with buffer 620c, and either inverter 622 or buffer 620c may be enabled at any given moment. Each RC circuit 610 may be implemented with a resistor and a capacitor that may be coupled as shown for RC circuit 510 in FIG. 5. Each RC circuit 610 has a switch 616 coupled across the input and output of that RC circuit.

Each RC circuit 610 provides 45° of phase shift, each buffer 620 provides 0° of phase shift, and inverter 622 provides 180° of phase shift. For each RC circuit 610, the associated switch 616 may be either closed to provide 0° of phase shift or opened to provide 45° of phase shift. Buffer 620c may be enabled and inverter 622 may be disabled to provide 0° of phase shift. Conversely, buffer 620c may be disabled and inverter 622 may be enabled to provide 180° of phase shift. A desired phase shift within a range of 0° to 315° in discrete steps of 45° may be obtained by appropriately closing or opening each switch and enabling either buffer 620c or inverter 622.

FIGS. 5 and 6 show two specific designs of phase adjustment circuit 410. The phase adjustment may also be performed with other designs. In general, the phase adjustment may be configurable (e.g., as shown in FIGS. 5 and 6) or may be fixed (e.g., set to a fixed phase shift). If the phase adjustment is configurable, then the phase adjustment may be varied in discrete steps (e.g., as shown in FIGS. 5 and 6) or may be continuously variable.

Figure 7:
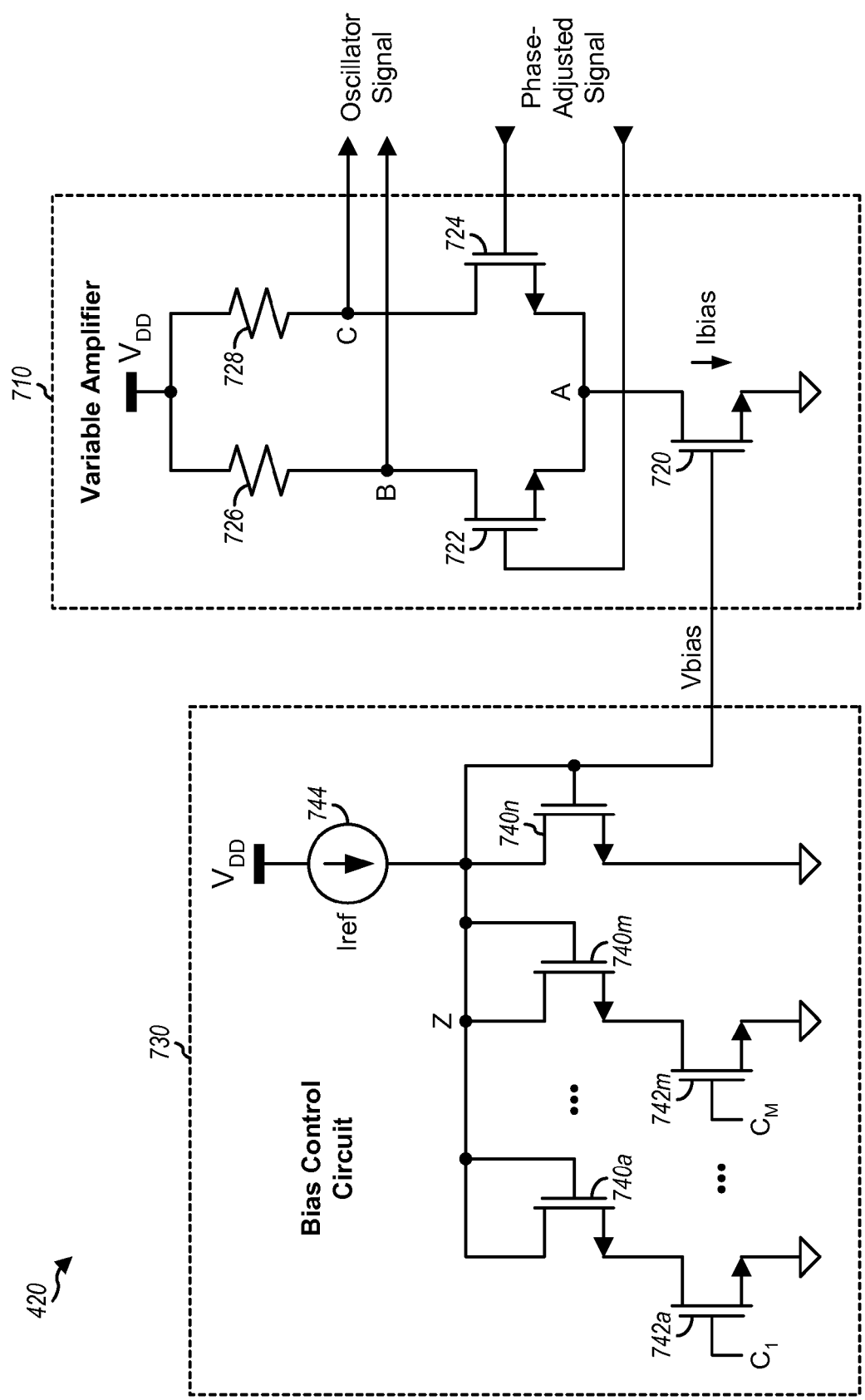
FIG. 7 shows a schematic diagram of an amplitude adjustment circuit.

FIG. 7 shows a schematic diagram of a design of amplitude adjustment circuit 420 in FIG. 4. In this design, amplitude adjustment circuit 420 includes a variable amplifier 710 and a bias control circuit 730. Within amplifier 710, an N-channel metal oxide semiconductor (NMOS) transistor 720 has its source coupled to circuit ground, its gate receiving a bias voltage Vbias, and its drain coupled to node A. NMOS transistors 722 and 724 are coupled as a differential pair and have their sources coupled to node A, their gates receiving a differential phase-adjusted signal, and their drains coupled to nodes B and C, respectively. Resistors 726 and 728 have one end coupled to a power supply $V_{DD}$ and the other end coupled to nodes B and C, respectively. A differential oscillator signal is provided from nodes B and C.

Within bias control circuit 730, M NMOS transistors 740a through 740m are coupled in parallel and have their gates and drains coupled to node Z. M NMOS transistors 742a through 742m are also coupled in parallel and have their sources coupled to circuit ground, their gates receiving M control signals $C_1$ through $C_M$, and their drains coupled to the sources of NMOS transistors 740a through 740m, respectively. An NMOS transistor 740n is coupled in parallel with NMOS transistors 740a through 740m and has its source coupled to circuit ground and its gate and drain coupled to node Z. A current source 744 provides a reference current of Iref and is coupled between the power supply and node Z.

Amplifier 710 amplifies the phase-adjusted signal with a variable gain and provides the oscillator signal. NMOS transistor 720 is the same type of device as NMOS transistors 740a through 740n but may be larger than the total size of NMOS transistors 740a through 740n. NMOS transistors 722 and 724 are the same type of device and are designed to operate at the VCO frequency.

The gain of amplifier 710 is dependent on the bias current Ibias through NMOS transistor 720. The gain may be varied by adjusting the Ibias current. The Ibias current is dependent on the Iref current from current source 744 as well as the ratio of the size of NMOS transistor 720 to the combined size of selected ones of NMOS transistors 740a through 740n. NMOS transistor 740n is always selected. Each of NMOS transistors 740a through 740m may be selected by asserting their associated control signal C. NMOS transistors 740a through 740m may be selected (or switched in) to increase the combined size of NMOS transistors 740, which would then reduce the Ibias current and lower the gain of amplifier 710. Conversely, NMOS transistors 740a through 740m may be de-selected (or switched out) to increase the Ibias current and raise the gain of amplifier 710.

In general, any number of NMOS transistors 740 may be coupled in parallel, and M may be any value. More NMOS transistors may be used to achieve finer gain resolution and hence finer amplitude adjustment of the oscillator signal.

FIG. 7 shows a specific design of amplitude adjustment circuit 420. The amplitude adjustment may also be performed with other designs. In general, the amplitude adjustment may be configurable (e.g., as shown in FIG. 7) or may be fixed (e.g., set to a fixed gain). If the amplitude adjustment is configurable, then the amplitude adjustment may be varied by discrete steps (e.g., as shown in FIG. 7) or may be continuously variable.

Only coarse adjustment of the amplitude and/or phase of the oscillator signal may be sufficient to mitigate VCO pulling. Thus, it may not be necessary to perform amplitude and phase adjustment for each individual RFIC. For a given transmitter design, the amplitude and phase settings that can provide good performance may be determined, e.g., via empirical measurements, computer simulation, etc. All RFICs for that transmitter design may then be configured with the same amplitude and phase settings.

Figure 8:
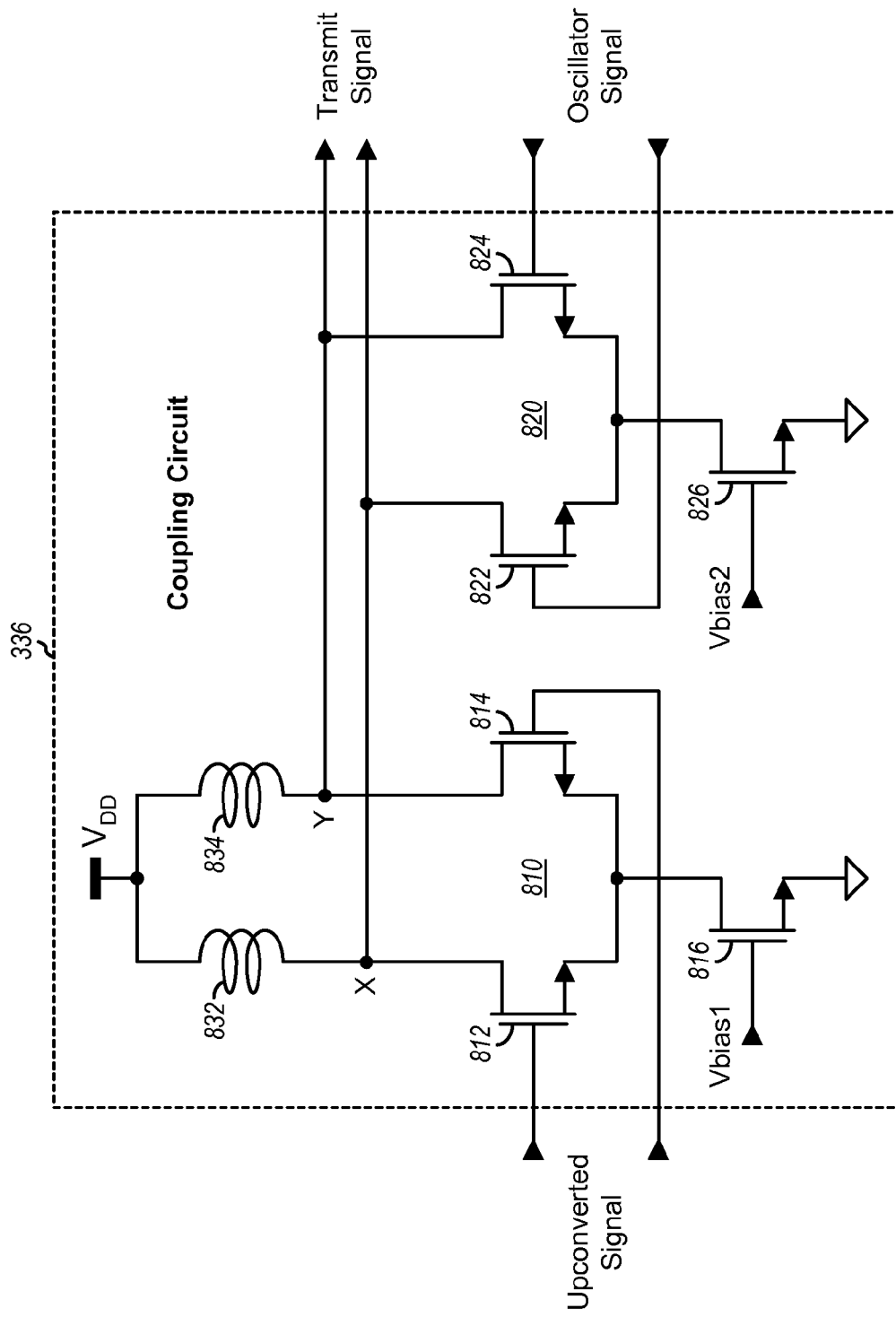
FIG. 8 shows a schematic diagram of a coupling circuit.

FIG. 8 shows a schematic diagram of a design of coupling circuit 336 in FIG. 3. Within coupling circuit 336, NMOS transistors 812 and 814 are coupled as a differential pair 810 and have their sources coupled together, their gates receiving a differential upconverted signal from upconverter 330, and their drains coupled to nodes X and Y, respectively. An NMOS transistor 816 has its source coupled to circuit ground, its gate receiving a first bias voltage Vbias1, and its drain coupled to the sources of NMOS transistors 812 and 814. NMOS transistors 822 and 824 are coupled as a differential pair 820 and have their sources coupled together, their gates receiving the differential oscillator signal from amplitude and phase adjustment unit 370, and their drains coupled to nodes X and Y, respectively. An NMOS transistor 826 has its source coupled to circuit ground, its gate receiving a second bias voltage Vbias2, and its drain coupled to the sources of NMOS transistors 822 and 824. Inductors 832 and 834 are coupled between the power supply $V_{DD}$ and nodes X and Y. A differential transmit signal is provided from nodes X and Y.

The Vbias1 voltage may be generated to provide the desired gain for the upconverted signal. The Vbias2 voltage may be generated to provide the desired gain for the oscillator signal. The amplified upconverted signal and the amplified oscillator signal are summed at current summing nodes X and Y.

Inductors 832 and 834 form an inductive load for differential pairs 810 and 820 and may have a resonant frequency at the LO frequency or at the transmit frequency. Inductors 832 and 834 may pass signal components at the LO frequency and may attenuate signal components at higher harmonics of the LO frequency. Inductors 832 and 834 may be replaced by resistors or an active load, which may allow for a flatter gain response with respect to frequency.

FIG. 8 shows one design of coupling circuit 336 in FIG. 3. Coupling circuit 336 may also be implemented with other designs. In another design, summer 334 within upconverter 330 is a current summing node, and coupling circuit 336 provides a current that is summed by the summing node. In another design, coupling circuit 336 is implemented with a signal trace that is in close proximity with another signal trace in the transmitter. In yet another design, coupling circuit 336 capacitively couples the oscillator signal to the transmitter. Coupling circuit 336 may also inject the oscillator signal into the transmitter in other manners.

Figure 2B:
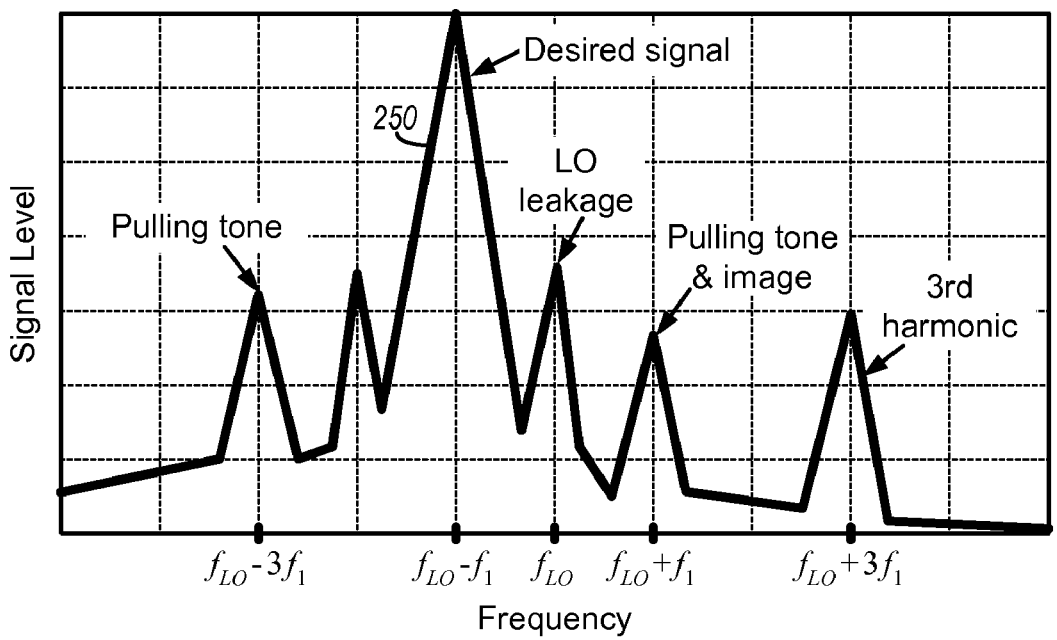
FIG. 2B shows distortions in an RF output signal with mitigation of VCO pulling.

FIG. 2B shows distortions in the RF output signal in FIG. 3 with injection of the oscillator signal in the transmitter to mitigate VCO pulling. A plot 250 shows the spectral response of the RF output signal with the baseband signals including a single tone at a frequency of $-f_1$. As shown in FIG. 2B, the RF output signal includes pulling tones at frequencies of $f_{LO}-3f_1$ and $f_{LO}+f_1$. However, these pulling tones are reduced in level in comparison to the level shown in FIG. 2A. Lab measurements indicate that the lower level of the pulling tones can improve performance.

Figure 9:
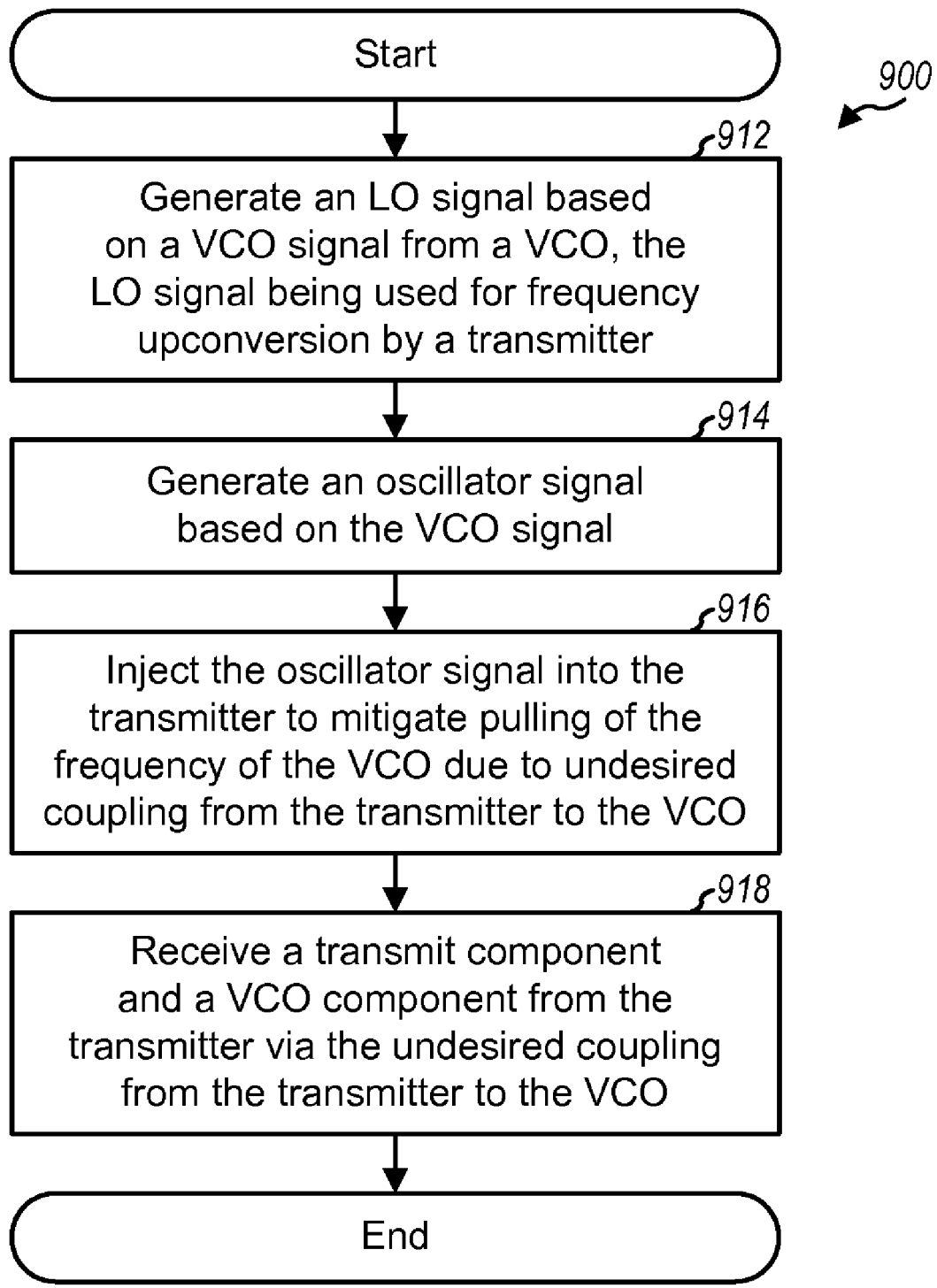
FIG. 9 shows a process for mitigating VCO pulling.

FIG. 9 shows a design of a process 900 for mitigating VCO pulling. An LO signal may be generated based on a VCO signal from a VCO and may be used for frequency upconversion by a transmitter (block 912). The LO signal may be a single LO signal or a quadrature LO signal composed of I and Q LO signals, as shown in FIGS. 1 and 3. The LO signal may be generated by dividing the VCO signal by N (e.g., N=2) in frequency and may have a frequency that is 1/N-th the frequency of the VCO signal.

An oscillator signal may be generated based on the VCO signal, e.g., with the VCO signal as shown in FIG. 3 or with the LO signal (block 914). For block 914, the phase of the oscillator signal may be adjusted in discrete steps. One of a plurality of discrete phase shifts may be provided for the oscillator signal, e.g., as shown in FIG. 5 or 6. The amplitude of the oscillator signal may be adjusted with an adjustable gain, e.g., as shown in FIG. 7. The oscillator signal may also be generated based on the VCO signal in other manners. The oscillator signal may be a version of the VCO signal and may include component at the frequency of the VCO.

The oscillator signal may be injected into the transmitter to mitigate pulling of the frequency of the VCO due to undesired coupling from the transmitter to the VCO (block 916). A transmit component and a VCO component may be received from the transmitter via the undesired coupling from the transmitter to the VCO (block 918). The transmit component causes pulling of the frequency of the VCO and comprises the N-th harmonic of a modulated signal in the transmitter. The VCO component mitigates the pulling of the frequency of the VCO and comprises a component of the injected oscillator signal at the VCO frequency. The amplitude of the oscillator signal may be set such that the VCO component is larger than the transmit component at the VCO.

The techniques for mitigating VCO pulling described herein may be used for various wireless communication systems and networks. For example, the techniques may be used for Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, wireless local area networks (WLANs), wireless personal area networks (WPANs), etc. The techniques may also be used for various radio technologies such as Universal Terrestrial Radio Access (UTRA) and cdma2000 for CDMA, Global System for Mobile Communications (GSM) for TDMA, Evolved UTRA (E-UTRA) and Ultra Mobile Broadband (UMB) for OFDMA, IEEE 802.11 for WLAN, Bluetooth for WPAN, etc. UTRA includes Wideband CDMA (WCDMA) and other variants of CDMA. cdma2000 covers IS-2000, IS-95 and IS-856 standards. The techniques may also be used for various frequency bands such as cellular band, Personal Communication Services (PCS) band, IMT-2000 band, UMTS bands, etc.

The various circuits used for the techniques described herein (e.g., the phase adjustment circuit, amplitude adjustment circuit, and coupling circuit) may be implemented on an IC, an analog IC, an RFIC, a mixed-signal IC, an application specific integrated circuit (ASIC), a printed circuit board (PCB), an electronics device, etc. These circuits may also be fabricated with various IC process technologies such as complementary metal oxide semiconductor (CMOS), N-channel MOS (NMOS), P-channel MOS (PMOS), bipolar junction transistor (BJT), bipolar-CMOS (BiCMOS), silicon germanium (SiGe), gallium arsenide (GaAs), etc.

An apparatus implementing the techniques and circuits described herein may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR), (iv) an ASIC such as a mobile station modem (MSM), (v) a module that may be embedded within other devices, (vi) a receiver, cellular phone, wireless device, handset, or mobile unit, (vii) etc.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. An apparatus for mitigating VCO pulling effects due to re-circulated signal energy along undesired coupling paths comprising:
   a voltage-controlled oscillator (VCO) operative to generate a VCO signal;
   a local oscillator (LO) generator operative to receive the VCO signal and generate a LO signal used for frequency upconversion in a transmitter; and
   a coupling circuit operative to receive an oscillator signal generated based on the VCO signal,
   wherein:
      the coupling circuit injects the oscillator signal into the transmitter, and
      the coupling circuit re-circulates the injected oscillator signal back to the VCO using the undesired coupling paths which cause the VCO pulling effects, the re-circulated oscillator signal being operable to neutralize the VCO pulling effects.

2. The apparatus of claim 1, further comprising:
   a phase adjustment circuit operative to adjust phase of the VCO signal to generate the oscillator signal.

3. The apparatus of claim 2, wherein the phase adjustment circuit adjusts the phase of the VCO signal in discrete steps and provides one of a plurality of discrete phase shifts for the oscillator signal.

4. The apparatus of claim 2, wherein the phase adjustment circuit comprises:
   a plurality of RC circuits coupled in series, each RC circuit providing a target amount of phase shift at the frequency of the VCO.

5. The apparatus of claim 1, further comprising:
   an amplitude adjustment circuit operative to adjust amplitude of the VCO signal to generate the oscillator signal.

6. The apparatus of claim 5, wherein the amplitude adjustment circuit comprises:
   a variable amplifier operative to provide amplification with an adjustable gain to adjust the amplitude of the VCO signal.

7. The apparatus of claim 6, wherein the amplitude adjustment circuit further comprises:
   a bias control circuit operative to provide a bias control for the variable amplifier, the bias control determining the adjustable gain of the variable amplifier.

8. The apparatus of claim 1, wherein the coupling circuit comprises:
   a first amplifier operative to amplify an upconverted signal, and
   a second amplifier operative to amplify the oscillator signal, the first and second amplifiers having outputs coupled together and providing a transmit signal comprising the injected oscillator signal.

9. The apparatus of claim 1, wherein the LO generator divides the VCO signal by two in frequency and generates the LO signal having a frequency that is one half the frequency of the VCO signal.

10. The apparatus of claim 1, wherein the VCO receives a transmit component and a VCO component from the transmitter via the undesired coupling from the transmitter to the VCO, the transmit component causing pulling of the frequency of the VCO, the VCO component comprising a component of the injected oscillator signal at the frequency of the VCO and mitigating the pulling of the frequency of the VCO.

11. The apparatus of claim 10, wherein the frequency of the VCO is N times an output frequency of the transmitter, where N is greater than one, wherein the transmit component comprises N-th harmonic of a modulated signal in the transmitter, and wherein amplitude of the oscillator signal is set such that the VCO component is larger than the transmit component at the VCO.

12. An integrated circuit for mitigating VCO pulling effects due to re-circulated signal energy along undesired coupling paths comprising:
   a voltage-controlled oscillator (VCO) operative to generate a VCO signal;
   a local oscillator (LO) generator operative to receive the VCO signal and generate a LO signal used for frequency upconversion in a transmitter; and
   coupling circuit operative to receive an oscillator signal generated based on the VCO signal,
   wherein:
      the coupling circuit injects the oscillator signal into the transmitter, and
      the coupling circuit re-circulates the injected oscillator signal back to the VCO using the undesired coupling paths which cause the VCO pulling effects, the re-circulated oscillator signal being operable to neutralize the VCO pulling effects.

13. The integrated circuit of claim 12, further comprising:
   a phase adjustment circuit operative to adjust phase of the VCO signal.

14. The integrated circuit of claim 12, further comprising:
   an amplitude adjustment circuit operative to adjust amplitude of the VCO signal to generate the oscillator signal.

15. A method for mitigating VCO pulling effects due to re-circulated signal energy along undesired coupling paths comprising:
   generating a voltage-controlled oscillator (VCO) signal;
   generating a local oscillator (LO) signal based on the VCO signal, the LO signal being used for frequency upconversion by a transmitter;
   generating an oscillator signal based on the VCO signal; and
   injecting the oscillator signal into the transmitter to mitigate pulling of frequency of the VCO due to undesired coupling from the transmitter to the VCO,
   wherein the injected oscillator signal is re-circulated back to the VCO using the undesired coupling paths which causes the VCO pulling effects, the re-circulated oscillator signal being operable to neutralize the VCO pulling effects.

16. The method of claim 15, wherein the generating the oscillator signal comprises:
   adjusting phase of the VCO signal in discrete steps and providing one of a plurality of discrete phase shifts for the oscillator signal.

17. The method of claim 15, wherein the generating the oscillator signal comprises:
   adjusting amplitude of the VCO signal with an adjustable gain.

18. The method of claim 15, wherein the generating the LO signal comprises:
   dividing the VCO signal by two in frequency to generate the LO signal having a frequency that is one half the frequency of the VCO signal.

19. The method of claim 15, further comprising:
   receiving a transmit component and a VCO component from the transmitter via the undesired coupling from the transmitter to the VCO, the transmit component causing pulling of the frequency of the VCO, the VCO component comprising a component of the injected oscillator signal at the frequency of the VCO and mitigating the pulling of the frequency of the VCO.

20. An apparatus for mitigating VCO pulling effects due to re-circulated signal energy along undesired coupling paths comprising:

means for generating a voltage-controlled oscillator (VCO) signal;

means for generating a local oscillator (LO) signal based on the VCO signal, the LO signal being used for frequency upconversion by a transmitter;

means for generating an oscillator signal based on the VCO signal;

means for injecting the oscillator signal into the transmitter to mitigate pulling of frequency of the VCO due to undesired coupling from the transmitter to the VCO; and means for re-circulating the injected oscillator signal back to the VCO using the undesired coupling paths which cause the VCO pulling effects, the re-circulated oscillator signal being operable to neutralize the VCO pulling effects.

21. The apparatus of claim 20, wherein the means for generating the oscillator signal comprises:

means for adjusting phase of the VCO signal in discrete steps and providing one of a plurality of discrete phase shifts for the oscillator signal.

22. The apparatus of claim 20, wherein the means for generating the oscillator signal comprises:

means for adjusting amplitude of the VCO signal with an adjustable gain.

23. The apparatus of claim 20, wherein the means for generating the LO signal comprises:

means for dividing the VCO signal by two in frequency to generate the LO signal having a frequency that is one half the frequency of the VCO signal.

24. The apparatus of claim 20, further comprising:

means for receiving a transmit component and a VCO component from the transmitter via the undesired coupling from the transmitter to the VCO, the transmit component causing pulling of the frequency of the VCO, the VCO component comprising a component of the injected oscillator signal at the frequency of the VCO and mitigating the pulling of the frequency of the VCO.

25. A non-transitory storage medium having processor-executable instructions stored thereon, the instructions being configured to cause a processor to perform operations comprising:

generating a voltage-controlled oscillator (VCO) signal;

generating a local oscillator (LO) signal based on the VCO signal, the LO signal being used for frequency upconversion by a transmitter;

generating an oscillator signal based on the VCO signal; and injecting the oscillator signal into the transmitter to mitigate pulling of frequency of the VCO due to undesired coupling from the transmitter to the VCO, wherein the injected oscillator signal is re-circulated back to the VCO using the undesired coupling paths which cause the VCO pulling effects, the re-circulated oscillator signal being operable to neutralize the VCO pulling effects.

26. The non-transitory storage medium of claim 25, wherein the non-transitory storage medium has processor-executable software instructions configured to cause the mobile device processor to perform further operations comprising:

adjusting phase of the VCO signal in discrete steps and providing one of a plurality of discrete phase shifts for the oscillator signal.

27. The non-transitory storage medium of claim 25, wherein the non-transitory storage medium has processor-executable software instructions configured to cause the mobile device processor to perform further operations comprising:

adjusting amplitude of the VCO signal with an adjustable gain.

28. The non-transitory storage medium of claim 25, wherein the non-transitory storage medium has processor-executable software instructions configured to cause the mobile device processor to perform further operations comprising:

dividing the VCO signal by two in frequency to generate the LO signal such that the LO signal has a frequency that is one half the frequency of the VCO signal.

29. The non-transitory storage medium of claim 25, wherein the non-transitory storage medium has processor-executable software instructions configured to cause the mobile device processor to perform further operations comprising:

receiving a transmit component and a VCO component from the transmitter via the undesired coupling paths formed between the transmitter to the VCO, wherein the transmit component causes a pulling of the frequency of the VCO, and wherein the VCO component comprises a component of the injected oscillator signal at the frequency of the VCO and mitigates the pulling of the frequency of the VCO.

* * * * *